July 20, 1954
C. N. ANDERSON
2,684,424
ROLLER ELECTRODE SPOT WELDER
Filed Aug. 27, 1951
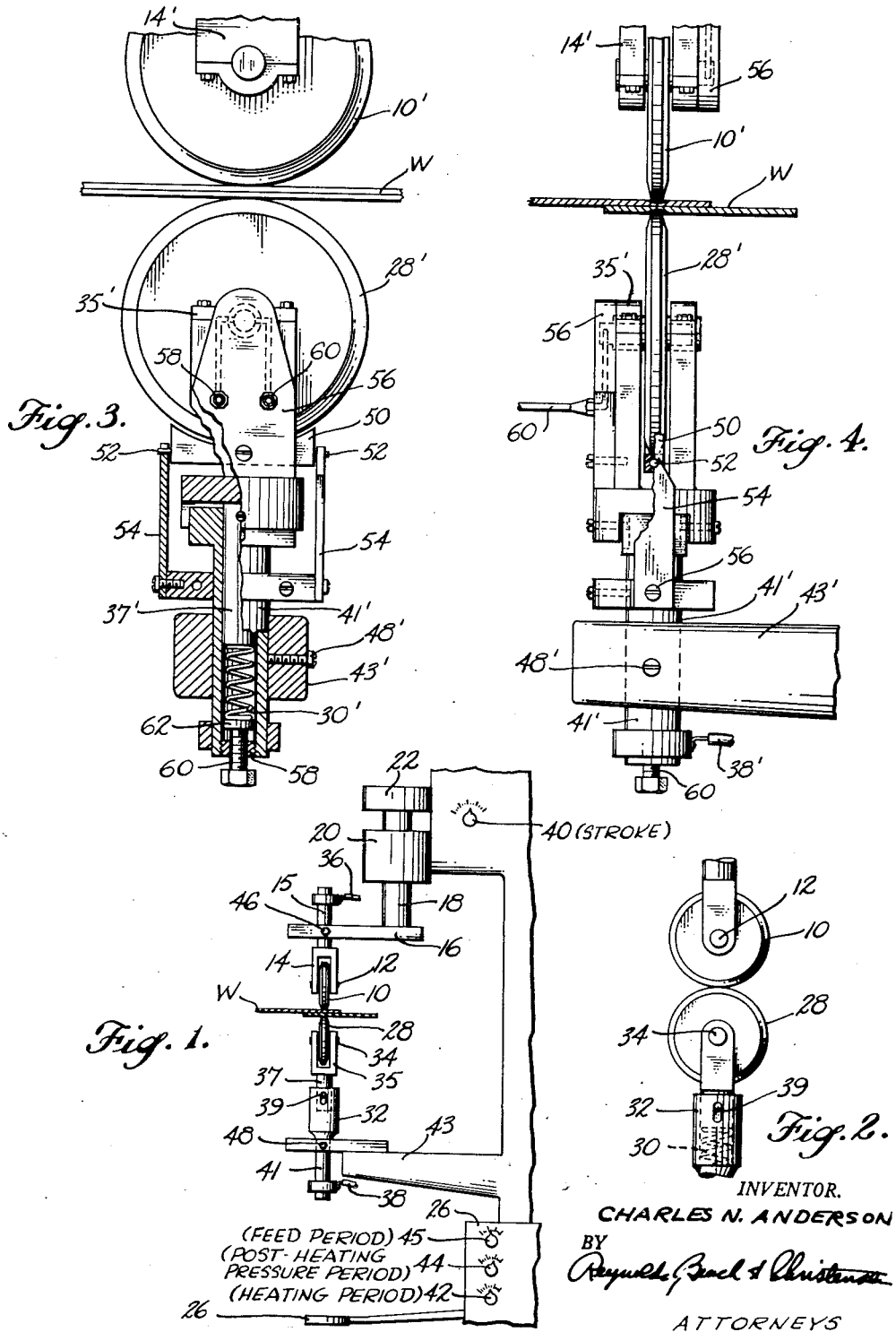
INVENTOR.
CHARLES N. ANDERSON
BY
Reynolds, Beach & Christensen
ATTORNEYS Patented July 20, 1954

2,684,424

UNITED STATES PATENT OFFICE 2,684,424

ROLLER ELECTRODE SPOT WELDER

Charles N. Anderson, Renton, Wash., assignor to Boeing Airplane Company, Seattle, Wash., a corporation of Delaware Application August 27, 1951, Serial No. 243,771

5 Claims. (Cl. 219—4)

This invention relates to spot welding apparatus and has for its general object a relatively simple manual feed machine capable of a much higher production rate than was formerly attainable with manual feed machines while being capable of operating successfully with work materials ranging widely in thickness and especially with thin sheet metal.

Up to the present most, if not all, sheet metal spot welding operations in airplane factories and other manufacturing plants striving for large production volume have been accomplished with spot welders of the reciprocating rod electrode type with manual feed and with or without automatic recycling of electrode operation. Automatic feed machines, apart from their greater cost, have been unsuited to such work because of the difficulty with them of selectively controlling weld locations and weld spacings during any given operation. For instance, if such a machine were set for operating with a particular weld spacing close enough for ample welded strength in heavily stressed areas of a piece of work, then the spacing selected would be too close for economical welding in work areas requiring less strength. The converse would also be true as to spacing adjustments optimum for work areas requiring minimum welded strength. On the other hand, conventional rod-electrode welders have not given production volume as high as might be desired, even when provided with automatic electrode recyclying, i. e. continuous automatic reciprocation of at least one electrode to and from the work in timed relation with electric energy applications.

It was observed that a major source of limitation on production rate in these conventional welders was the time lost during each total cycle in producing useless movement of the movable (usually upper) electrode, in traveling into and out of contact with the work at the beginning and end of each welding cycle. This lost time represented a large part of the total cycle of the machine and served no purpose other than to provide clearance to feed the work in the period between successive welds. In any conventional machine of a given size and capacity employing a reciprocating spot welding electrode this lost time could not be greatly reduced by any practicable changes in design contemplating faster movement of the electrode, due to inherent inertia of the moving structure, lost motion incurred in displacing necessary pressure controlling springs, and the limited mechanical power available.

Moreover any attempt to increase the attainable operating frequency of such former machines by reducing the period of lost time consumed in movement of the rod electrode through the route of shortening its stroke only created work clearance problems. Inadequate clearance or spacing of the rod electrodes from the work in the periods between successive electrode contacts therewith caused rubbing and chafing and made feeding and guiding the work difficult and tiresome. Thin and flimsy work tended to buckle because of electrode drag.

The present invention is directed to the provision of a high production machine of the automatic recycling electrode type, and is especially aimed at accomplishing this object as economically as possible by permitting incorporation of major components and assemblies of conventional machines where desired. With a conventional machine modified in accordance with the present invention it proved possible to nearly triple the rate of production formerly attainable, especially with thin sheet metal work, and to produce better work. Moreover, longer wearing electrodes requiring less frequent dressing than conventional rod electrodes and posing simpler cooling problems resulted.

In the improved machine the conventional rod electrodes are replaced by idler roller electrodes. The work is fed manually in the usual step-by-step manner and at the desired constant or variable rate accompanying operation of the automatic electrode recycling apparatus of the machine. Provisions of the improved machine for automatically holding one or both roller electrodes against rotation accompanying electrode pressure applications during actual welding periods function to prevent untimely shifting of the work by the operator and weakening of the welds produced. However, in the work-feed periods between actual welding periods the roller electrode braking action is automatically removed accompanying reductions of electrode pressure, so that the work may then be fed freely between the roller electrodes.

A basically important advantage of the improved manual feed automatic electrode-recycling spot welder is the considerable shortening of the mechanical stroke of the electrode reciprocating apparatus now permitted without causing frictional drag and work buckling, as the rolling action of the electrodes permits them to remain in contact with the work at all times. A higher recycling frequency, hence a higher work output rate, is thereby achievable by saving time lost previously in retracting and advancing electrodes, while preserving all the flexibility and other advantages of the former type manual feed machine. It is merely necessary that electrode pressure on the work be reduced after each weld in order to remove the braking effect mentioned above and permit advancing the work for the next weld. In fact the steadying effect and rolling support of the work by roller electrodes greatly facilitates feeding and guiding the work accurately through the machine. In the improved machine there is no tendency for thin and flimsy work to buckle because of rubbing of former rod electrodes thereon when electrode clearances were reduced in previous machines, and instead guidance of the work is actually facilitated by the rolling contact now provided.

Preferably braking is applied to one or both electrodes in the improved machine by a separate friction brake of the electrode-pressure actuated type, for instance, or in some cases by the mere bearing friction of the roller electrode shafts alone accompanying welding pressure of the electrodes on the work. It should be understood, however, that other automatic cyclical braking devices could be used for the purpose, those described herein being merely illustrative.

The foregoing and other features, objects and advantages of the invention, including certain details of construction of preferred embodiments thereof, will become more fully apparent from the following description by reference to the accompanying drawings. These drawings are intended as illustrative of the preferred form of the invention, but are by no means the only applications or embodiments thereof which may be employed.

Figure 1 is a simplified side elevation of a spot welding machine incorporating the invention, portions of the machine being broken away and certain portions illustrated schematically.

Figure 2 is a simplified front elevation view on an enlarged scale of the roller electrodes and their supports in such a machine.

Figure 3 is a simplified front elevation view on a larger scale of the roller electrodes and a friction brake in the lower electrode support.

Figure 4 is a side elevation of the electrodes and supports appearing in Figure 3.

In Figures 1 and 2 the upper roller electrode 10 is free to rotate on its supporting shaft 12, mounted between the arms of a support 14. This support in turn is carried by a reciprocative head 16 mounted on the lower end of a piston rod 18. The rod 18, in turn, is guided for vertical reciprocation in the actuating cylinder 20 and retracting cylinder 22, both usually pneumatic, and containing pistons, as in conventional spot welding machines of the type previously mentioned herein. The details of such machines and of the retraction and actuating cylinder mechanisms, together with automatic controls therefor are well known, so that a particular illustration or description herein of suitable techniques involved is deemed unnecessary. Continued automatic recycling of the electrodes mechanically and electrically is accomplished in the illustrated machine simply by maintaining the pedal 24 in depressed position to operate the automatic controls shown simply as a unit 26 in the figure. Sciaky Patents 2,415,708 (February 11, 1947) and 2,474,866 (July 5, 1949) illustrate automatic recycling apparatus by which electrode energization may be controlled automatically in recurrent manner, and disclose means by which electrode reciprocation may be timed therewith. Other types of control apparatus accomplishing the desired ends will be obvious.

The lower electrode 28 is freely rotatable on its supporting shaft 34 mounted between the arms of the support 35. This support is fixed on the upper end of a cylindrical post 37 slidably received in the supporting tube 32 and restrained against rotation therein by a slot and pin connection 39 (Figure 2). A compression spring 30 is received in the lower end of the tube 32 and acts upwardly therefrom against the post 37 to urge the lower electrode 28 against the under side of the work W. The extension shank 41 of the tube 32 is supported by a horizontal arm structure 43 on the machine frame to locate the lower roller electrode 28 exactly below the upper roller electrode 10, as shown. A setscrew 46 threaded through a bore in the reciprocating head 16 holds the extension shank 15 of the upper electrode support in fixed position relative to such head, but may be loosened to adjust the position of upper electrode 10 up or down relative to the head. A similar setscrew 48 threaded through a bore in the lower electrode support arm 43 engages the extension 37 but may be loosened to permit similar adjustment of the lower electrode's position, up or down.

The reciprocative head 16 is initially at its upper limit of travel effected by retraction of piston rod 18. Electrode 10 is then in its elevated position but remains in contact with the work W due to the upward pressure of the lower electrode 28 against the lower face of the work caused by the spring 30 housed in the lower electrode support tube 32, as shown. Pressure of the electrodes against opposite faces of the work is then a minimum, being established by the residual force of spring 30 in the elevated position of upper electrode 10. At this time the work W may be advanced between the electrodes 10 and 28 without appreciable resistance as such electrodes roll freely on the work. The operator alone establishes the rate of advance of the work at this time.

Such manual feed movement of the work is subsequently stopped automatically by friction braking in the machine illustrated in Figure 1. Such braking occurs when the automatic recycling apparatus 26 causes actuating cylinder 20 to depress the upper electrode 10 and work contacted thereby downwardly against the progressively increasing resistance of spring 30 in reaction to downward yielding of the lower electrode under the advance of the upper electrode. The friction braking effect mentioned results simply from frictional drag between the roller electrodes 10 and 28 and their respective supporting shafts 12 and 34 when pressed against each other by the force of compressed spring 30 in the descended position of upper electrode 10. This friction is sufficient ordinarily to prevent any further movement of the work in the line of feed, so that shifting of the work cannot occur during the ensuing actual weld cycle and spoil the quality of the weld produced. Electrical energy is supplied to the electrodes through their conductive supports and conductors 36 and 38 from a suitable source (not shown) automatically upon application of electrode working pressure to the work, i. e. upon full descent of upper electrode 10.

The residual force of spring 30 in the uppermost position of the electrodes is established by the length of stroke of upper electrode 10. This force, of course, represents the minimum electrode pressure against the work and ordinarily is adjustable in machines of the type described, as by adjusting the length of stroke of the upper electrode, means for the adjustment being symbolized by the control knob 40 in Figure 1. The duration of the electric energy impulse supplied to the electrodes is also conventionally adjustable in such machines, means for its adjustment being symbolized by the control knob 42 in the figure. This period of time, during which the work is being heated by flow of the electric current between the electrodes, is selected in accordance with the thickness of the work.

At the end of the heating period selected by adjustment of knob 42, the electrical circuit is automatically opened by control apparatus 26. However, the upper electrode 10 is not immediately raised by the automatic recycling apparatus upon deenergization of the electrodes, as it is desirable to maintain electrode pressure on the work for a short period of time thereafter during which time the work is permitted to cool and the weld to set. If desired, this period of time may be adjusted in accordance with the nature of the work by suitable means symbolized by the third control knob 44 in Figure 1.

At the end of the time period just mentioned, the control apparatus 26 automatically actuates retracting cylinder 22 to raise the electrode 10 into elevated position and thereby reduce the electrode pressure on the work to relieve the roller electrodes of their shaft friction. The electrodes will then roll freely and, for a predetermined period of time, permit the operator to advance the work W readily between them by another increment for the succeeding welding operation. Such operation is initiated automatically by the recycling control apparatus 26 at the end of the work feed period by again applying pressure and electrical energy to the electrodes. The work feed period may be fixed or may be made adjustable, as desired, involving familiar devices in either case, a control knob 45 being shown in Figure 1 to represent means for this adjustment.

In Figures 3 and 4 the modified electrode arrangement differs from that in the preceding figures with respect to the manner in which electrode braking is accomplished. In the modified form a more positive braking action applied to the lower electrode is achieved by use of friction brake shoe 50, which bears against the lower periphery of lower electrode 28' as a result of electrode pressure during the weld cycle of the machine. The brake shoe 50 is suspended under the lower electrode 28' by pins 52 received in notches in the upper ends of the fixed supporting yoke 54. This yoke is fixed on the tubular shank extension 41' of the lower electrode support and may be adjusted up or down along such extension by loosening its set-screw 56. The shank extension 41' in turn is slidably adjustable in the horizontal lower electrode supporting arm 43', a set-screw 48' being provided as in the previously described form of the machine. The tubular shank extension 41' is closed at its lower end by a screw plug 58, which has a tapped bore to receive the bolt 60. The latter carries a plunger 62 on its upper end inside the tubular extension 41' to constitute an adjustable stop therein for the spring 30' which bears upwardly against the post 37' carrying the lower electrode support 35'. When the upper electrode 10' is raised and lowered, preloaded spring 30' expands and contracts as post 37' slides up and down in the tube 41' and maintains both electrodes in contact with the work.

When properly adjusted for operation, the position of the brake shoe 50 in relation to the axis of roller electrode 28' in the latter's elevated position, is such that the desired pressure of a contact between the lower periphery of such electrode and the brake shoe is established at the instant the electrode reaches its desired lowermost position during descent of the upper electrode 10' into its depressed position for welding. In other words, the yoke 54 is positioned along the tubular member 41' so that the brake shoe 50 will not prevent full descent of the electrodes under actuation of the automatic recycling apparatus of the machine, but will nevertheless firmly engage the electrode rim when that position is attained. Spring 30' serves the same function as spring 30 in the preceding described form of the machine.

In Figures 3 and 4 the electrodes are water-cooled in accordance with a usual practice involving suitable heads 56 and suitable inlet and outlet hoses or conduits 58 and 60 connected thereto for supplying cooling water to the hollow electrode interior through hollow electrode supporting shafts. The mere use of roller electrodes, however, even without separate cooling provisions, affords advantages over conventional rod electrodes in machines of the type described because of the continual presentation of new electrode surfaces to the work as progressive welding takes place. Moreover, dressing of roller electrodes is much less a problem than in conventional rod type electrode machines.

The main advantage, however, of the improved machine lies in the much greater production volume which may be achieved by permitting the length of stroke of the reciprocating apparatus to be reduced to a minimum, representing merely the movement necessary to deflect the spring 30 or 30' sufficiently for attaining the desired maximum and minimum pressures thereof. A larger proportion of the total operating cycle of the machine is thus put to effective use and the electrode actuating mechanism can be recycled much more rapidly than heretofore. In the operation of the improved machine the roller electrodes may actually remain in continuous contact with the work, although expansion and contraction of the spring (30 or 30') will cause the desired variation in electrode pressure, so that at minimum pressure the work may be advanced readily between the electrodes which roll freely thereon, whereas at maximum pressure the work pieces are held together for welding and the electrodes are braked against any movement which the operator might otherwise cause at the wrong time to disturb the weld. The continued contact of the electrodes with the work and the use of roller electrodes are both factors which greatly facilitate the guiding of the work along a desired path and thereby improve the quality of welding as well as greatly increasing the volume of work that may be done with the improved machine.

I claim as my invention:

1. A manual feed spot welding machine comprising upper and lower roller electrodes and supports therefor, means comprised in said supports rotatively supporting said electrodes to roll freely on the work fed therebetween, cyclically operating means operable to reciprocate at least one of said electrode supports for advancement toward and retraction from the other intermittently, resilient means interposed operatively between one of said supports and its electrode and deflectable progressively in response to advancement of said reciprocative support to establish progressively increasing electrode pressure on the work during such advancement, means for adjusting the stroke of such cyclically operative means and thereby the deflection limits of said resilient means to establish the maximum and minimum electrode pressures on the work during reciprocation of said reciprocative support, without actually breaking physical contact of said electrodes with the work, and normally released brake means cooperating with at least one of said electrodes to apply a rotation-braking effect thereto automatically in response to positioning of said cyclically operative means in applying maximum electrode pressure to the work.

2. In a spot welding machine, upper and lower freely rotatable roller electrodes, means supporting said electrodes to receive work therebetween, means cooperating with said support including pressure applying means operable to increase and decrease electrode pressure on the work cyclically without breaking physical contact therebetween, and brake means cooperating with at least one such electrode to apply braking force thereto automatically in response to attainment of maximum electrode pressure against the work, thereby preventing shifting of the work during weld cycles, and to remove such braking force automatically in response to a reduction of the electrode pressure below such maximum, thereby freeing the braked electrode for rolling freely on the work between weld cycles.

3. In a manual feed spot welding machine of the type having upper and lower electrode supports and means for reciprocating at least one of said supports cyclically toward and from the other intermittently in timed relation to electric energy applications to electrodes carried by said supports; upper and lower roller electrodes carried by the respective upper and lower electrode supports adapted for rolling contact with work being advanced therebetween, one of said electrodes being mounted on its support to permit relative reciprocation therebetween in the line of movement of said reciprocative support, yieldable resilient means interposed between said latter roller electrode and its support substantially continuously maintaining said electrode pressed against the work and the work against the opposing electrode by variable deflection of said resilient means effected by reciprocation of the reciprocative electrode support, and brake means cooperating with at least one of said supported electrodes automatically increasing resistance to advancement of the work between said roller electrodes by movement of said reciprocative support toward the work and decreasing such resistance by reverse movement of said reciprocative support.

4. The manual feed spot welding machine defined in claim 3, wherein the automatically acting brake means comprises antifrictional rotational support bearing means for at least one of the roller electrodes, said bearing means having coacting bearing surfaces inherently imposing materially varying rotational friction on such electrode effected by the varying electrode pressure on the work accompanying variable deflection of the resilient means.

5. The manual feed spot welding machine defined in claim 3, wherein the automatically acting brake means comprises frictional contact means substantially fixedly mounted on the electrode support carrying the resilient means in operative position thereon for intermittently frictionally engaging the associated roller electrode accompanying intermittent reciprocation of the reciprocative support toward the work.

References Cited in the file of this patent

UNITED STATES PATENTS

| Number | Name | Date |
| --- | --- | --- |
| 1,315,239 | Pierce et al. | Sept. 9, 1919 |
| 1,438,867 | Schroder | Dec. 12, 1922 |
| 1,778,628 | Eckman | Oct. 14, 1930 |
| 2,023,085 | Lavallee | Dec. 3, 1935 |
| 2,211,186 | Weston | Aug. 13, 1940 |
| 2,284,851 | Tiedeman | June 2, 1942 |
| 2,322,796 | Fentress | June 29, 1943 |
| 2,415,708 | Sciaky | Feb. 11, 1947 |
| 2,474,866 | Sciaky | July 5, 1949 |